(12) United States Patent
Abboud et al.

(10) Patent No.: US 7,279,192 B2
(45) Date of Patent: Oct. 9, 2007

(54) SHELF-STABLE SHREDDED CHEESE

(75) Inventors: Amna Munji Abboud, Germantown, TN (US); Jackie Robinson Epps, Collierville, TN (US); Timothy Dean Babcock, Moscow, TN (US); Amber Okwuosah, Memphis, TN (US)

(73) Assignee: Kraft Foods Holdings, Inc., Northfield, IL (US)

( * ) Notice: Subject to any disclaimer, the term of this patent is extended or adjusted under 35 U.S.C. 154(b) by 404 days.

(21) Appl. No.: 10/420,185

(22) Filed: Apr. 22, 2003

(65) Prior Publication Data

US 2004/0213884 A1  Oct. 28, 2004

(51) Int. Cl.
*A23C 19/00* (2006.01)

(52) U.S. Cl. .......................... 426/582; 426/36; 426/573

(58) Field of Classification Search ................ 426/582, 426/573, 583, 36
See application file for complete search history.

(56) References Cited

U.S. PATENT DOCUMENTS

| | | | | |
|---|---|---|---|---|
| 4,032,669 A | * | 6/1977 | Peters et al. | 426/573 |
| 4,198,439 A | * | 4/1980 | Hoover | 426/632 |
| 4,430,356 A | * | 2/1984 | Ohyabu et al. | 426/574 |
| 4,482,575 A | * | 11/1984 | Olds | 426/582 |
| 4,567,047 A | * | 1/1986 | Wilson | 426/94 |
| 5,626,893 A | | 5/1997 | Reddy | |
| 5,658,609 A | | 8/1997 | Abboud et al. | |
| 5,807,601 A | * | 9/1998 | Carpenter et al. | 426/578 |
| 5,851,576 A | | 12/1998 | Abboud | |
| 5,876,770 A | | 3/1999 | Zaikos et al. | |
| 5,902,625 A | * | 5/1999 | Barz et al. | 426/582 |
| 5,935,634 A | * | 8/1999 | Gamay et al. | 426/582 |
| 6,017,571 A | * | 1/2000 | Cross et al. | 426/518 |
| 6,905,719 B2 | * | 6/2005 | Wang et al. | 426/94 |
| 2002/0155198 A1 | | 10/2002 | Wang et al. | |
| 2004/0086598 A1 | | 5/2004 | Maegli et al. | |

FOREIGN PATENT DOCUMENTS

| | | |
|---|---|---|
| EP | 0750843 | 1/1997 |
| EP | 0750843 A2 * | 1/1997 |
| EP | 1174039 | 1/2002 |
| EP | 1174039 A2 * | 1/2002 |
| GB | 2237178 A * | 5/1991 |

* cited by examiner

*Primary Examiner*—Keith Hendricks
*Assistant Examiner*—Kelly Mahafkey
(74) *Attorney, Agent, or Firm*—Fitch, Even, Tabin & Flannery

(57) ABSTRACT

The present invention provides shelf-stable shredded cheeses and methods of preparing such shelf-stable shredded cheeses using a combination of a natural or process cheese, a cheese powder, glycerin, and a filler. The shredded cheeses of this invention are shelf-stable at ambient temperatures, have good organoleptic properties, and exhibit good melt restriction and essentially no browning upon melting. The shredded cheeses of this invention are especially adapted for incorporated into, or use on or with, snack foods (e.g., chips) for retail sale which can be stored at ambient temperatures.

7 Claims, No Drawings

SHELF-STABLE SHREDDED CHEESE

FIELD OF THE INVENTION

This invention relates to shelf-stable shredded cheeses and methods of preparing such shelf-stable shredded cheeses using a combination of natural or process cheese, cheese powder, glycerin, and filler. The shredded cheeses of this invention are shelf-stable at ambient temperatures, have good organoleptic properties (e.g., not brittle or dry), and exhibit good melt restriction with essentially no browning upon melting. The shredded cheeses of this invention are especially adapted for incorporated into, or use on or with, snack foods (e.g., chips and the like).

BACKGROUND OF THE INVENTION

Shredded cheese is a growing component of the overall cheese market largely because such a product offers the consumer convenience in the preparation of a wide variety of products in the home kitchen. Shredded cheeses, for example, can be used as toppings or ingredients in homemade dishes such as pizzas, casseroles, salads, and the like and in retail snack products.

Shredded cheeses often employ anti-caking agents such as cellulose-based products or formulations. For example, U.S. Pat. No. 5,626,893 (May 6, 1997) provided an anti-caking agent formulated from fine mesh vegetable flour, bentonite, cellulose, and antimycotic agents or bacterial cultures. This anti-caking agent reportedly reduces the stickiness of the chunked, diced, or shredded cheese, improves the functionality of the cheese, and reduces yeast and/or mold growth.

U.S. Pat. No. 5,876,770 (Mar. 2, 1999) provided a reduced fat shredded cheese prepared by applying a small amount of fat to the surface of an essentially fat-free shredded natural cheese. The reduced fat shredded cheese product had melt and mouthfeel characteristics similar to that of the corresponding full-fat cheese product but with significantly reduced levels of fat. More recently, U.S. patent application Ser. No. 09/618,514, filed Jul. 18, 2000 (assigned to the assignee of the present application and hereby incorporated by reference) provided natural cheese shreds containing a nutritional calcium supplement; the calcium supplement also provided non-agglomerating properties whereby conventional anti-caking agents could be significantly reduced or eliminated.

Conventional cheese products generally have water activities of about 0.92 to about 1 and must, therefore, be stored at refrigerated temperatures. Attempts to produce shelf-stable cheese which can be stored at room temperature have generally involved the reduction of moisture in the cheese composition. Such efforts generally result in a brittle and dry cheese which is not acceptable for most uses. Such defects are especially noticeably when such cheeses are used to prepare shredded cheese because of the increased surface area of shredded cheese.

Using the process of this invention, shredded cheeses which are shelf-stable at ambient temperatures and exhibit good melt restriction and essentially no browning (i.e., when melted at about 375° F. for about 3 minutes) can be prepared. Using a combination of a natural or process cheese, a cheese powder, glycerin, and a filler, the present invention provides a shelf-stable shredded cheese having low water activity without brittleness and dryness. The shredded cheeses of this invention are especially adapted for incorporated into, or use on or with, retail snack foods.

SUMMARY OF THE INVENTION

The present invention provides shelf-stable shredded cheeses and methods of preparing such shelf-stable shredded cheeses using a combination of a natural or process cheese, a cheese powder, glycerin, and a filler. The shredded cheeses of this invention are shelf-stable at ambient temperatures, have good organoleptic properties, and exhibit good melt restriction and essentially no browning upon melting. The shredded cheeses of this invention are especially adapted for incorporation into, or use on or with, snack foods. For example, the shredded cheeses of this invention can be used on chips, crackers, and other snack foods which can be stored at room temperatures (especially low water activity snack foods). If desired, such foods can be eaten as is or briefly heated in, for example, a microwave oven before consuming. An especially preferred food product prepared with the shredded cheese of this invention is a low water activity chip topped with the shredded cheese of this invention and spices; such a product can be stored without refrigeration and is suitable eating as it or for heating (e.g., sufficient to melt the cheese) by the consumer prior to consumption.

The shelf-stable shredded cheese of the present invention comprises (1) natural or process cheese, (2) cheese powder, (3) glycerin, and (4) filler; wherein the shelf-stable shredded cheese has a water activity of less than about 0.5, exhibits good melting properties, and has a shelf life of at least about 3 months at ambient temperatures. A preferred shelf-stable shredded cheese comprises (1) about 3 to about 30 percent natural or process cheese, (2) about 5 to about 60 percent cheese powder, (3) about 5 to about 25 percent glycerin, (4) about 15 to about 45 percent filler, (5) 0 to about 25 percent sweetness modifier, and (6) 0 to about 5 percent emulsifier; wherein the shelf-stable shredded cheese has a water activity of less than about 0.5, exhibits good melting properties, and has a shelf life of at least about 3 months at ambient temperatures. A more preferred shelf-stable shredded cheese comprises (1) about 10 to about 20 percent natural or process cheese, (2) about 30 to about 45 percent cheese powder, (3) about 5 to about 15 percent glycerin, (4) about 20 to about 40 percent filler, (5) 0 to about 3 percent sweetness modifier, and (6) 0 to about 3 percent emulsifier; wherein the shelf-stable shredded cheese has a water activity of about 0.3 to about 0.45, exhibits good melting properties, and has a shelf life of at least about 3 months at ambient temperatures. When included in the compositions of this invention, the sweetness modifier is preferably at about 0.5 to about 3 percent and the emulsifier is preferably at about 0.5 to about 3 percent.

In another embodiment, the present invention provides a shelf-stable shredded cheese comprising (1) a cheese product selected from the group consisting of natural cheese, process cheese, cheese powder, and mixtures thereof, (2) glycerin, and (4) filler; wherein the shelf-stable shredded cheese has a water activity of less than about 0.5, exhibits good melting properties, and has a shelf life of at least about 3 months at ambient temperatures. A more preferred shelf-stable shredded cheese comprises (1) about 3 to about 60 percent cheese product, (2) about 5 to about 15 percent glycerin, (3) about 20 to about 40 percent filler, (4) 0 to about 3 percent sweetness modifier, and (5) 0 to about 3 percent emulsifier; wherein the shelf-stable shredded cheese has a water activity of about 0.3 to about 0.45, exhibits good melting properties, and has a shelf life of at least about 3 months at ambient temperatures. Preferably, the chesses product contains both natural or process cheese and cheese powder.

The present invention also provides a method of preparing a shelf-stable shredded cheese, said method comprising (A) heating a mixture comprising (1) about 3 to about 30 percent natural or process cheese, (2) about 5 to about 60 percent cheese powder, (3) about 5 to about 25 percent glycerin, (4) about 15 to about 45 percent filler, (5) 0 to about 25 percent sweetness modifier, and (6) 0 to about 5 percent emulsifier at a temperature and for a time sufficient to obtain a homogenous mixture; (B) cooling the homogenous mixture to form a solid cheese composition; and (C) shredding the solid cheese composition to form the shelf-stable shredded cheese, wherein the shelf-stable shredded cheese has a water activity of less than about 0.5, exhibits good melting properties, and has a shelf life of at least about 3 months at ambient temperatures. Water can be added as need; unless the level of natural or process cheese is low, no additional water, other than that contained in the various components, is generally required.

DETAILED DESCRIPTION OF THE INVENTION

The present invention provides a shelf-stable shredded cheese which has a water activity of less than about 0.5, exhibits good melting properties, and has a shelf life of at least about 3 months at ambient temperatures. More preferably, the shelf-stable shredded cheese of the present invention has a water activity of about 0.3 to about 0.45 and a shelf life of at least about 3 months at ambient temperatures. For purposes of this invention, "good melting properties" is intended to mean that the shredded cheese exhibits good melt restriction (i.e., significant reduction or elimination of both stickiness and rapid skin formation upon melting), exhibits essentially no browning and generally retains its shape or form upon melting (i.e., heated to about 375° F. for three minutes).

The shelf-stable shredded cheese of the present invention comprises (1) natural or process cheese, (2) cheese powder, (3) glycerin, and (4) filler; wherein the shelf-stable shredded cheese has a water activity of about 0.3 to about 0.45, exhibits good melting properties, and has a shelf life of at least about 3 months at ambient temperatures. A preferred shelf-stable shredded cheese comprises (1) about 3 to about 30 percent natural or process cheese, (2) about 5 to about 60 percent cheese powder, (3) about 5 to about 25 percent glycerin, (4) about 15 to about 45 percent filler, (5) 0 to about 25 percent sweetness modifier, and (6) 0 to about 5 percent emulsifier. A more preferred shelf-stable shredded cheese comprises (1) about 10 to about 20 percent natural or process cheese, (2) about 30 to about 45 percent cheese powder, (3) about 5 to about 15 percent glycerin, (4) about 20 to about 40 percent filler, (5) 0 to about 3 percent sweetness modifier, and (6) 0 to about 3 percent emulsifier.

The process or natural cheeses employed in the present invention may be derived from the treatment of any dairy liquid that provides cheese curds upon rennetting (using either cheese-making cultures or direct acidification). Suitable natural cheeses include, by way of nonlimiting example, Cheddar cheese, Colby cheese, Monterey Jack, Havarti cheese, Muenster cheese, Brick cheese, Gouda cheese, and the like. For purposes of this invention, "process or natural cheeses" is intended to include cream cheeses and other soft cheeses. Mixtures of such natural cheeses and process cheeses may also be used. Generally the process or natural cheese is present in the present compositions at about 3 to about 30 percent, and more preferably about 10 to about 20 percent.

Suitable cheese powders include commercially available cheese powders prepared from natural or process cheeses. Such cheese powders generally have a low moisture content (generally less than about 3 percent). Examples of suitable commercially available cheese powders included, for example, Cheez Tang®, Sequio®, and Exceed® 2000 (available from Kraft Foods, Inc.). Generally the cheese powder is present in the present compositions at about 5 to about 60 percent, and more preferably at about 30 to about 45 percent.

The shelf-stable shredded cheese of the present invention contain significant amounts of glycerin (generally about 5 to about 30 percent). Although not wishing to be limited by theory, the glycerin appears to act as a solvent to help overcome the brittleness and dryness normally associated with low moisture cheese products. By incorporating glycerin in the present compositions, organoleptic pleasing cheese shreds can be obtained at low moisture levels (i.e., water activities below about 0.5). Glycerin also appears to provide the composition with sweetness level that may be undesirable. If desired, corn syrup (generally at 0 to about 10 percent) can be included in the composition to replace a portion of the glycerin or to supplement the glycerin.

The present compositions also contain fillers (generally at about 5 to 45 percent, preferably at about 20 to about 40 percent) to provide body and texture to the compositions. Suitable fillers include, for example, starches, fibers, inulin, dextrose, gums (i.e., water binders), and the like. Preferred fillers include the fat replacement compositions described in U.S. Pat. No. 6,658,609 (Aug. 19, 1997; vegetable fiber, starch, and gum) and U.S. Pat. No. 5,851,576 (Dec. 22, 1998; inulin and emulsifiers).

The shelf-stable shredded cheese of the present invention may also contain other ingredients so long as they do not significantly and adversely effect the organoleptic, melting, or stability properties of the present compositions. Such optional ingredients include, for example, sweetness modifiers (e.g., acid whey, sweet whey, whey protein concentrate, sugar inhibitors, and the like), emulsifiers (e.g., disodium phosphate, dipotassium phosphate, tricalcium phosphate, and the like), gums (e.g., carboxymethyl cellulose, xanthan, guar, and the like), flavorants (e.g., salt, cheese flavors, and the like), colorants, nutritional supplements (e.g., vitamins, minerals, antioxidants, probiotics, botanicals, and the like), anti-caking agents (e.g., calcium sulfate, potassium starch, cellulose, and the like), and the like as well as mixtures thereof. Although the shredded cheeses of this invention are shelf stable for long periods at ambient temperatures without any added preservatives, preservatives (e.g., natamycin, nisin, and the like), can be added if desired; it is generally preferred, however, that preservatives are not added.

Preferably, one or more of these optional ingredients are included in the present compositions. Sweetness modifiers are generally included in the present composition at 0 to about 25 percent, more preferably at about 3 to about 10 percent. Emulsifiers are generally included in the present composition at 0 to about 5 percent, more preferably at about 1 to about 3 percent. Gums are generally included in the present composition at 0 to about 3 percent, more preferably at 0 to about 0.2 percent. Flavorants are generally included in the present composition at 0 to about 2 percent, more preferably at about 0.1 to about 0.5 percent. Colorants are generally included in the present composition at 0 to about 1 percent, more preferably at about 01 to about 0.5 percent.

If desired, nutritional supplements (generally at levels of 0 to about 2 percent) can be included in the present composition. If desired, preservatives (generally at levels of 0 to about 2 percent) can be included in the present composition. Anti-caking agents are generally included in the present composition at 0 to about 5 percent, more preferably at about 1 to about 3 percent.

The shelf-stable shredded cheese of the present invention are generally prepared by mixing the natural or process cheese and glycerin (as well as any other liquid ingredients such as, for example, corn syrup) for a time and at a temperature sufficient to provide a homogenous mixture. Generally the natural or process cheese and glycerin are heated to about 110 to about 160° F. for about 5 to about 15 minutes. Although the other ingredients can be added at any time, it is generally preferred that the dry ingredients be added after the formation of the homogenous mixture of natural or process cheese and glycerin. Once the dry ingredients are added, mixing is continued until a homogenous cheese product is obtained; generally this mixing is at a temperature of about 100 to about 130° F. for about 5 to about 15 minutes. Once the final homogenous cheese mixture has been obtained, it is cooled to about 20 to about 45° F. After cooling, the final homogenous cheese mixture can be shredded immediately or at a later time to form pieces whose sizes are suitable for shredded cheese. In general, cheese fragments used in the present invention may be regular or irregular sized shreds, particles, or slices; regular sized shreds or particles are preferred. The size of the shredded pieces can vary widely but are generally about 1/32 to about 3/8 inches in diameter and about 0.75 to about 3 inches in length; more preferably, they are about 1/16 to about 1/8 inches in diameter and about 1 to about 2 inches in length. Of course, other shaped particles having similar dimensions to those just discussed can be used in the practice of this invention; such other shaped particles are intended to be included within the terms "shreds," "shredded," and the like.

The following examples are intended to illustrate the invention and not to limit it. Unless noted otherwise, all percentages throughout this specification are by weight. All patents, patent applications, and publication cited herein are incorporated by reference.

EXAMPLE 1

The following cheese formulations were prepared:

|  | Sample 1 (%) | Sample 2 (%) | Sample 3 (%) | Sample 4 (%) |
| --- | --- | --- | --- | --- |
| Cheese | 16.2 | 16.2 | 16.2 | 16.2 |
| Cheese Powder | 41.7 | 41.6 | 41.8 | 41.6 |
| Glycerin | 14.6 | 14.6 | 14.4 | 16.2 |
| Gellan Gum | 1.6 | 1.6 | 0 | 0 |
| Salt | 1.6 | 1.6 | 1.6 | 1.6 |
| Instant Starch | 6.8 | 6.8 | 6.9 | 6.8 |
| Filler I* | 15.6 | 15.5 | 0 | 0 |
| Filler II** | 0 | 0 | 17.2 | 15.3 |
| Cheese Flavor | 0 | 0.1 | 0 | 0.1 |
| Colorant | 0 | 0.8 | 0 | 0.05 |
| Disodium Phosphate | 1.9 | 1.9 | 1.9 | 1.9 |

*K-Blazer II ST (Kraft Foods, Inc.);
**K-Blazer II HP (Kraft Foods, Inc.)

In a steam jacketed bowl, the cheese, cheese powder, and glycerin were heated to about 100° F., for about 15 minutes to obtain a homogenous mixture. The emulsifier, filler I or II, and gum were added with continuous mixing after which the remaining ingredients were added. Mixing was continued for about 20 minutes at about 130° F. until a homogenous mixture was obtained. After cooling to about 40° F., a shredded cheese was formed using a conventional shredder; generally the sheds were, on average, about 1/16 inches in diameter and about 1 inch in length. The following results were obtained.

| Sample | Water Activity | Comments |
| --- | --- | --- |
| 1 | 0.416 | Shredded well; no browning upon melting |
| 2 | 0.460 | Shredded well; slight browning on edges of shreds upon melting |
| 3 | 0.405 | Shreds torn on edges; no browning upon melting |
| 4 | 0.410 | Shreds torn on edges; browning on ends of shreds upon melting |

All samples were shelf stable at ambient temperatures with good organoleptic properties.

EXAMPLE 2

The following cheese formulations were prepared:

|  | Sample 1 (%) | Sample 2 (%) | Sample 3 (%) | Sample 4 (%) |
| --- | --- | --- | --- | --- |
| Cheese | 15.6 | 15.1 | 15.2 | 11.8 |
| Cheese Powder | 42.9 | 43.0 | 41.4 | 32.2 |
| Glycerin | 15.0 | 15.1 | 14.5 | 11.3 |
| Salt | 1.7 | 1.7 | 1.6 | 1.2 |
| Instant Starch | 7.0 | 0 | 0 | 0 |
| Filler* | 16.0 | 16.0 | 15.4 | 12.0 |
| Gum | 0 | 0.2 | 0 | 0 |
| Disodium Phosphate | 1.9 | 1.9 | 1.9 | 1.4 |
| Whey | 0 | 7.0 | 10.0 | 30.0 |

*K-Blazer II ST (Kraft Foods, Inc.)

Heated glycerin (temperature of about 130° F. and an amount of about 15 percent of the total) and cheese were heated to about 150 to about 160° F. in a mixer to form a homogenous mixture. The various dry ingredients were then added and mixed into the cheese/glycerin mixture for about 3 minutes during which time the temperature fell to about 100° F. The remainder of the glycerin (chilled to below room temperature) was then added with mixing and cooled to about 70 to about 75° F. After further cooling to below room temperature, the resulting cheese was formed into cubes and then shredded using a conventional shredder; generally the sheds were, on average, about 1/16 inches in diameter and about 1 inch in length. After shredding, an anti-caking agent was added at about 3.5 percent and the cheese packaged under an inert gas flush. The following results were obtained.

| Sample | Water Activity | Comments |
| --- | --- | --- |
| 1 | 0.439 | Good cohesive product; little sweet aftertaste; good melting properties with no browning upon melting |
| 2 | 0.427 | Good cohesive product; very good taste; good melting properties with no browning upon melting |

-continued

| Sample | Water Activity | Comments |
|---|---|---|
| 3 | 0.405 | Good cohesive product; good taste; good melting properties with no browning upon melting |
| 4 | 0.406 | Sour taste; good melting properties with little browning upon melting |

All samples had good melting properties (i.e., retained shape upon heating in oven for 3 minutes at 375° F.).

EXAMPLE 3

The following formulations were prepared:

|  | Sample 1 (%) | Sample 2 (%) |
|---|---|---|
| Cheese | 12.8 | 12.8 |
| Cheese Powder | 26.2 | 26.1 |
| Glycerin | 11.1 | 11.1 |
| Corn Syrup (43DE) | 3.3 | 3.3 |
| Salt | 1.0 | 1.0 |
| Starch | 3.6 | 3.6 |
| Filler* | 16.4 | 16.3 |
| Acid Whey | 19.1 | 19.1 |
| Dextrose | 6.5 | 6.5 |
| Cheese Flavor | 0 | 0.1 |

*K-Blazer II ST (Kraft Foods, Inc.)

In a steam jacketed bowl, the cheese and corn syrup were heated to about 130° F. for about 1.5 minutes to obtain a homogenous mixture. Glycerin was then added followed by the remaining ingredients. Mixing was continued for about 3 minutes at about 130° F. until a homogenous mixture was obtained. After cooling to about 40° F., a shredded cheese was formed using a conventional shredder; generally the sheds were, on average, about 1/16 inches in diameter and about 1 inch in length. The following results were obtained.

| Sample | Water Activity | Comments |
|---|---|---|
| 1 | 0.410 | Soft & cohesive with no oil out; acid whey helped mask sweetness; no browning issues |
| 2 | 0.400 | Soft & cohesive with no oil out; better cheese flavor than Sample 1; acid whey helped mask sweetness; no browning issues |

We claim:

1. A shelf-stable shredded cheese composition comprising (1) natural or process cheese, (2) cheese powder, (3) glycerin, and (4) filler; wherein the shelf-stable shredded cheese composition has a water activity of less than about 0.5, exhibits good melting properties, has a shelf life of at least about 3 months at ambient temperatures, and wherein the shelf-stable shredded cheese composition comprises (1) about 10 to about 20 percent natural or process cheese, (2) about 30 to about 45 percent cheese powder, (3) about 5 to about 15 percent glycerin, (4) about 20 to about 40 percent filler, (5) 0 to about 3 percent sweetness modifier, and (6) 0 to about 3 percent emulsifier.

2. The shelf-stable shredded cheese composition of claim 1, wherein the filler is selected from the group consisting of starch, fiber, inulin, dextrose, gum, and mixtures thereof.

3. The shelf-stable shredded cheese composition of claim 2, wherein the sweetness modifier is selected from the group consisting of acid whey, sweet whey, whey protein concentrate, sugar inhibitors, and mixtures thereof.

4. A method of preparing a shelf-stable shredded cheese composition, said method comprising (A) heating a mixture comprising (1) about 10 to about 20 percent natural or process cheese, (2) about 30 to about 45 percent cheese powder, (3) about 5 to about 15 percent glycerin, (4) about 20 to about 40 percent filler, (5) 0 to about 3 percent sweetness modifier, and (6) 0 to about 3 percent emulsifier at a temperature and for a time sufficient to obtain a homogenous mixture; (B) cooling the homogenous mixture to form a solid cheese composition; and (C) shredding the solid cheese composition to form the shelf-stable shredded cheese composition, wherein the shelf-stable shredded cheese composition has a water activity of less than about 0.5, exhibits good melting properties, and has a shelf life of at least about 3 months at ambient temperatures.

5. The method of claim 4, wherein the filler is selected from the group consisting of starch, fiber, inulin, dextrose, gum, and mixtures thereof.

6. The method of claim 4, wherein the sweetness modifier is selected from the group consisting of acid whey, sweet whey, whey protein concentrate, sugar inhibitors, and mixtures thereof.

7. The method of claim 5, wherein the sweetness modifier is selected from the group consisting of acid whey, sweet whey, whey protein concentrate, sugar inhibitors, and mixtures thereof.

* * * * *